Nov. 22, 1949     E. RINEHART     2,489,048
INSULATED DUCT
Filed Dec. 3, 1947
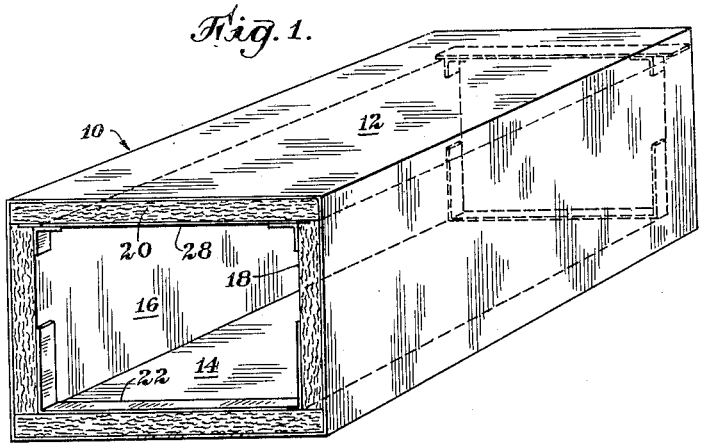
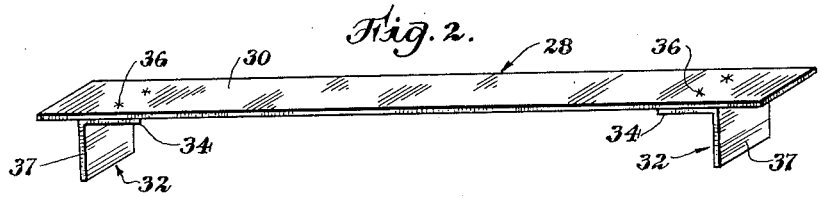
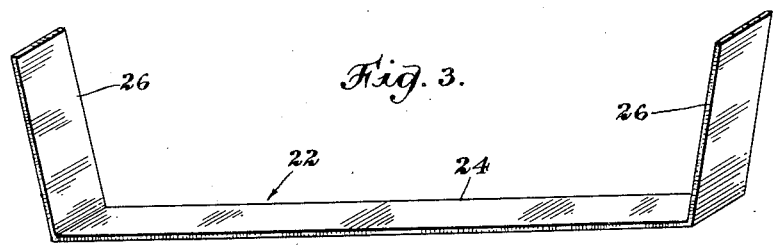
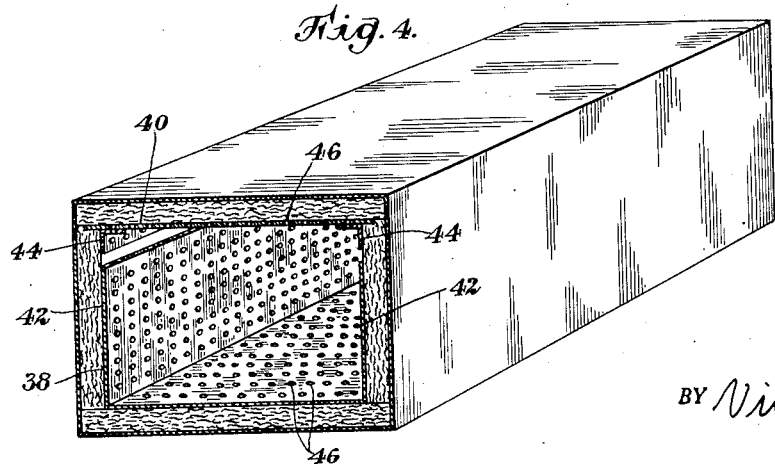
INVENTOR.
EVAN RINEHART.
BY Virgil C. Kline
ATTORNEY.

Patented Nov. 22, 1949

2,489,048

UNITED STATES PATENT OFFICE 2,489,048

INSULATED DUCT

Evan Rinehart, Port Washington, N. Y., assignor to Johns-Manville Corporation, New York, N. Y., a corporation of New York Application December 3, 1947, Serial No. 789,405

9 Claims. (Cl. 138—64)

1

The instant invention relates to air ducts or conduits and particularly to those employed in air conditioning systems and the like which should be insulated for economical operation of the system.

In the past it has been conventional to construct duct sections of sheet metal in convenient lengths, the sections being assembled to complete the duct or conduit and an insulating covering, blanket, or the like then secured around the duct. In order to avoid condensation of moisture within the insulation, particularly where the duct is to convey cooled air, it is essential to employ some type of vapor seal over the exterior of the insulating covering. However, it is difficult to provide an outer wrapping or coating which will provide a sufficiently tight seal to insure against the passage of moisture vapor into the insulation and the construction often fails in this respect. Furthermore, in many cases the close proximity of the conduit to electrical conduits, pipes, structural members, and the like, aggravates the difficulties and expense involved both in installing the insulation and in applying the vapor seal.

A principal object of the invention is the provision of an insulated duct, the duct per se preferably being made of sheet metal or other vapor impervious material, in which the insulation is placed interiorly of the duct, whereby the duct itself operates as the vapor barrier, the walls of the duct being isolated from the conveyed air by the insulating lining. In this construction the insulation performs the further function of absorbing sound from the interior of the duct and, hence, serves to reduce transmitted noise from air conditioning, ventilating equipment, and the like.

Another object of the invention is the provision of an insulated duct or conduit of the type referred to in which there are no through metal contacts from the interior of the insulating lining to the duct shell.

Another object of the invention is the provision of an insulating construction for a duct interior in which the insulation is in the form of semi-rigid, self-sustaining slabs and easily applied retaining members are employed to secure the insulating slabs in position.

A still further object of the invention is the provision of retaining or securing members for the insulating slabs which may be installed at intervals allowing the slabs to be exposed therebetween. In another form of the invention, for use particularly where the

2 conveyed air moves at a sufficiently high velocity to cause attrition of the slabs if exposed, the securing members extend the length of the duct section and cover substantially the entire exposed areas of the slabs. In this case the members are provided with distributed openings to permit transmission of sound to the insulation.

My invention will be more fully understood and further objects and advantages thereof will become apparent when reference is made to the more detailed description of a preferred embodiment of the invention which is to follow and to the accompanying drawings in which:

Fig. 1 is a perspective view of a duct section embodying the instant invention;

Fig. 2 is a perspective view of a supporting member employed in the construction of Fig. 1;

Fig. 3 is a view of a securing or retaining member employed in the construction of Fig. 1; and Fig. 4 is a view similar to Fig. 1 illustrating a modified embodiment of the invention.

Referring now to the drawings and first to Figs. 1–3 inclusive, the invention is shown as embodied in a duct section 10 formed of a shell 12 of rectangular cross section. The shell may be made of any vapor impervious, relatively rigid, structural sheet material which is sufficiently workable to be fabricated into duct sections. For this purpose preferably sheet metal is used, such as galvanized iron, in accordance with conventional practice.

As will be appreciated, the duct may be installed in the usual way, above a false ceiling or within a wall, the several sections being connected together by sealed, flanged connections, or the like, and the duct as a whole may be supported by suitable hangers.

In accordance with the instant invention shell 12 is provided with an insulating lining consisting of bottom slab 14, side slabs 16 and 18 respectively, and top slab 20. The insulating slabs may be made of any suitable material so long as they are self-sustaining, semi-rigid and have the required properties to perform their insulating function and to absorb sound from the interior of the duct. The preferred material for this purpose is a compressed slab of matted mineral wool, or like fibers, containing sufficient binder to maintain the fibrous mat in its compressed state and to impart to it the relative rigidity required. Such materials are readily available on the market. In lieu of mineral wool slabs, materials such as cork slabs and other insulating boards and bodies may be employed, it being understood that the instant invention is not limited to any particular type of insulating material so long as it has the physical properties mentioned.

The bottom and top slabs preferably extend the full width of the shell and are spaced apart by side slabs 16 and 18 inserted therebetween and resting against the lateral walls of the shell, whereby top slab 20 is supported on the upper edges of slabs 16 and 18. Slabs 16 and 18 are maintained in position against the walls of the shell by a retainer 22 (see particularly Fig. 3), the retainer consisting of a U-shaped member of springy metal, such as light gauge steel, having a base 24 of a length substantially equal to the distance between the inner surfaces of slabs 16 and 18, and legs 26 extending upwardly but in originally diverging planes. When the retainer is to be employed the legs are pressed inwardly against the spring action of the metal and the retainer inserted in proper position. When the legs are released they exert an outward spring pressure against slabs 16 and 18 and hold them firmly in position.

Where the duct is of such width that top slab 20 will span the distance between slabs 16 and 18 without substantial sagging, retainers 22 are alone sufficient for the entire support of the slabs. On the other hand, where the duct is relatively wide a supporting member 28 (see Fig. 2) is preferably employed in conjunction with retainer 22. Member 28 consists of a bar 30 of a suitable gauge metal, or the like, and of a length to span the space between slabs 16 and 18 and to project between the edges of the slabs and the upper slab 20. Suitably the extent of projection of the terminal portions of the bar is not more than, say, one-half the thickness of slabs 16 and 18 to insure against any through metal path to the shell 12. Secured to bar 30 are legs 32 consisting of angle members having a flange 34 secured to the bar as by welding, riveting, or the like, as indicated diagrammatically at 36 and downwardly directed flanges 37. The angle members are positioned so that the vertical flanges 37 will lie against slabs 16 and 18. The angle members thus serve both as positioning elements for the supporting member and as means for maintaining the upper margins of the side slabs against the shell.

In the construction shown in Figs. 1-3 inclusive, retainer 22 and supporting member 28 are relatively narrow and are employed at suitable intervals the length of the duct section. Consequently the major area of the inner walls of the insulating slabs will be directly exposed to the conveyed air whereby the slabs may absorb airborne sounds from within the duct, such as those created by air conditioning equipment, ventilating equipment, and the like.

In the event that the air is to be moved through the duct at such velocity that the walls of the slabs are subject to attrition, the construction shown in Fig. 4 is employed. In this case retainer 38 and supporting member 40 correspond in their essentials to elements 22 and 28, respectively but, instead of being narrow and employed at intervals, they are made the same length as the duct section. Also, either or both legs 42 of retainer 38 and the vertical flanges 44 of the angle members of support 40 are extended to meet, or substantially meet, whereby the interior of the duct is provided with a lining. The lining protects the surfaces of the slabs from attrition by the rapidly moving air. To permit the sound absorbing function of the slabs to take place, the lining is provided with a multiplicity of perforations 46. The perforations may be relatively small but in large number to expose a substantial proportion of the area of the slabs to airborn sound in accordance with conventional practice in the acoustical arts.

The constructions described above provide a fully insulated duct. The insulation may be installed in the duct section either before assembly or after each section is assembled, as desired. In either case, no difficulties are involved and the close proximity of other conduits, pipes, structural members and the like in no way affects the operation. The shell of the duct provides a complete vapor seal and, inasmuch as it is entirely insulated from the conveyed air by the slabs of insulation, without any through metal parts, which would provide paths for the conduction of heat, there will be no condensation of moisture vapor which, in prior practice has often caused soaking of the insulation and dripping of water onto interior finishes.

Having thus described my invention in rather full detail it will be understood that these details need not be strictly adhered to but that various changes and modifications may suggest themselves to one skilled in the art, all falling within the scope of the invention as defined by the subjoined claims.

What I claim is:

1. In an air duct or the like, a lining therefor comprising self-sustaining, semi-rigid, sound-absorbing and heat-insulating slabs including bottom, side and top slabs, and means resiliently forcing said side slabs outwardly toward the sides of the duct to maintain them in position.

2. In an air duct or the like, a lining therefor comprising self-sustaining, semi-rigid, sound-absorbing and heat-insulating slabs including bottom, side and top slabs, and a U-shaped retainer having a base and outwardly tensioned legs with said base resting on said bottom slab, and said legs lying against said side slabs and pressing them against the walls of the duct.

3. In an air duct or the like, a lining therefor comprising self-sustaining, semi-rigid, sound-absorbing and heat-insulating slabs including bottom, side and top slabs, a relatively narrow strip of springy metal of U-shape contour having a base resting against said base slab, and outwardly tensioned legs resting against said side slabs and holding them in position.

4. In an air duct or the like, a lining therefor comprising self-sustaining, semi-rigid, sound-absorbing and heat-insulating slabs including bottom, side and top slabs with the top slab supported on the side slabs, means resiliently forcing said side slabs outwardly toward the sides of the duct to maintain them in position, and a supporting member having terminal portions inserted between said top slab and side slabs and spanning the opening between said side slabs to support said top slab against sagging.

5. In an air duct or the like, a lining therefor comprising self-sustaining, semi-rigid, sound-absorbing and heat-insulating slabs including bottom, side and top slabs with the top slab supported on the side slabs, a U-shaped retainer having a base and outwardly tensioned legs with said base resting on said bottom slab, and said legs lying against said side slabs and pressing them against the walls of the duct, and a supporting member having terminal portions inserted between said top slab and side slabs and spanning the space between said side slabs to support said top slab against sagging.

6. In an air duct or the like, a lining therefor comprising self-sustaining, semi-rigid, sound-absorbing and heat-insulating slabs including bottom, side and top slabs with the top slab supported on the side slabs, a U-shaped retainer having a base and outwardly tensioned legs with said base resting on said bottom slab, and said legs lying against said side slabs and pressing them against the walls of the duct, a supporting member having terminal portions inserted between said top slab and side slabs and spanning the space between said side slabs to support said top slab against sagging, and flanges projecting downwardly from said supporting member, said flanges lying contiguous to said side slabs.

7. In a conduit or the like comprising a duct section, a liner therefor comprising self-sustaining, semi-rigid, sound-absorbing and heat-insulating slabs including bottom, side and top slabs with the top slab supported on the side slabs, a U-shaped retainer having a base and outwardly tensioned legs extending upwardly from said base and lying against said side slabs, and a supporting member spanning the space beneath said top slab and having terminal portions between the side and top slabs, and flanges projecting downwardly contiguous to said side slabs, said U-shaped member and said supporting member extending substantially the length of said duct section.

8. A retainer for supporting an insulating liner within a duct, the liner including top, side and bottom slabs of a self-sustaining, semi-rigid, sound-absorbing and heat-insulating material, said retainer comprising a U-shaped element having a base and springy legs extending upwardly from said base and outwardly from planes vertical to said base whereby, when said retainer is placed in said conduit with its base in contact with said bottom slab, said legs exert an outward force against said side slabs to hold them in position, said U-shaped element extending substantially the length of said slabs and having a plurality of distributed perforations to permit the passage of sound therethrough.

9. A member for supporting an insulating liner within a duct, the liner including top, side and bottom slabs of a self-sustaining, semi-rigid, sound-absorbing and heat-insulating material, said member comprising an element adapted to bridge the space between the side slabs and having terminal portions insertable between the side and top slabs, and flanges extending from the element in position to lie contiguous to the side slabs.

EVAN RINEHART.

REFERENCES CITED

The following references are of record in the file of this patent:

UNITED STATES PATENTS

| Number | Name | Date |
| --- | --- | --- |
| 1,803,817 | Tremellen | May 5, 1931 |
| 2,420,425 | Hardwick | May 13, 1947 |

OTHER REFERENCES

Publication, "Heating, Piping, and Air Conditioning," May 1937, page 143. Published by Keeney Publishing Company, 6 N. Michigan Ave., Chicago, Ill. (Copy in Library and copy of advertisement in Div. 52.)